United States Patent Office 3,212,994
Patented Oct. 19, 1965

3,212,994
METHOD OF PRODUCING L-GLUTAMIC ACID
BY FERMENTATION
Kageaki Kono, Yoshio Iijima, Asaichiro Ozaki, and Noboru Miyachi, Tokyo, Japan, assignors to Ajinomoto Kabushikikaisha and Sanraku Ocean Kabushikikaisha, both of Tokyo, Japan, both corporations of Japan
No Drawing. Filed May 6, 1963, Ser. No. 278,435
Claims priority, application Japan, May 4, 1962, 37/17,545; Oct. 12, 1962, 37/44,077
7 Claims. (Cl. 195—29)

This invention relates to a method of producing L-glutamic acid by fermentation. More particularly it relates to a method of producing L-glutamic acid in a large quantity by aerobically cultivating L-glutamic acid producing microbes in a culture medium containing biotin or other biotin-like micronutrients in more than the amount required to produce optimal growth of the microbes, the essential step in which is an addition of alcohol or alcohols to the culture medium when it is producing L-glutamic acid, thereby securing a considerable yield of L-glutamic acid. The object of this invention is to obtain L-glutamic acid with higher industrial efficiency by using cheap saccharine materials such as black strap molasses, refined molasses, high-test molasses and the like; cane juice, beet juice, raw sugar and the like; sweet potato, dried sweet potato, potato, milo, corn, wheat, cassava-root, cassava chip, cassava meal, sago, hydrolysed liquor of starchy materials and the like.

In the conventional fermentation method of L-glutamic acid production, the cultivating of the microbes used in the method required biotin and the like; and it was one of the essential conditions for the fermentation to add biotin and the like, or 7.8 diaminopelargonic acid (DAPA) and the like, or some substance containing these to a culture medium mainly composed of a carbon source, a nitrogen source and other organic and inorganic materials. It has been an established theory that there is an intimate relationship between the amount of this addition and the yield of L-glutamic acid, and it therefore has been considered necessary that these micro-nutrients be contained in the culture medium in an amount less than that which results in optional growth of the microbes.

If these contents are excessive, the growth of the microbes will be promoted and sugar metabolism will be invigorated, but the yield of L-glutamic acid will markedly decrease. It is for this reason that in the said fermentation method, the carbon source has been such saccharine materials as glucose or hydrolysate of starch containing relatively small amounts of these nutrients to which were added optimal amount of biotin or DAPA. It has been believed that materials containing large amounts of these micro-nutrients, when adopted as a culture medium will promote the excessive growth of the microbes but decrease the yield of L-glutamic acid.

It has been a long-cherished wish of producers to obtain L-glutamic acid on an economically profitable, industrial basis through fermentation using such inexpensive materials as black strap molasses, refined molasses, high-test molasses, cane juice, beet juice, raw sugar, hydrolysate of sweet potato, dried sweet potato, potato, milo, corn, wheat, cassava-root, cassava chip, cassava meal, sago; and other hydrolysate of starchy material obtained in the course of starch production.

To be more specific, the microbes capable of producing L-glutamic acid through fermentation need biotin for their growth, but when the amount of biotin contained in the culture medium is more than optimum, the yield of L-glutamic acid will decrease. To the best of our knowledge, for the majority of those microbes industrially available for this fermentation the optimal amount of biotin in the culture medium ranges from 1 to 8 $\gamma/l$. depending on the strain used.

This optimal amount may be obtained in a synthetic medium using starch hydrolysate or glucose with relative ease, but the aforementioned medium with hydrolysate of starchy material, raw sugar, molasses, etc. as substrate has a biotin content far exceeding the said optimal amount. Namely, the biotin content of a culture medium of hydrolysate of starchy materials such as corn, milo, wheat, etc. is 20 to 50 $\gamma/l$., while that of a culture medium prepared from a dilution of molasses reaches as large as 30 to 200 $\gamma/l$. When microbes are cultivated in such medium using the conventional method, they will vigorously grow without, however, yielding any substantial amount of L-glutamic acid.

Strenuously working on the solution of this difficulty, the present inventors discovered, with subsequent perfection of this invention, that in spite of the presence of biotin in excess, large quantities of glutamic acid can be secured and accumulated by adding an optimal amount of alcohols from the start, or at a certain appropriate stage of fermentation, to a culture medium containing more than optimal amount of biotin for the microbes used.

Concrete procedures for carrying out the present invention include a method of adding alcohols to a medium which contains an excessive proportion of biotin from the start or in the course of cultivation in a single dose or in several doses; a method of letting a conventional L-glutamic acid fermentation process proceed in an optimal biotin containing medium, and adding alcohol either once or several times, either before, simultaneously with, or after a step by step feeding of saccharine material containing an excessive amount of biotin in the course of cultivation, and others, all these procedures being covered by the claims of the present invention.

The composition of the culture medium employed for this fermentation is the same as that for the common L-glutamic acid fermentation, except for the biotin and biotin-like substances.

The microbes available for this invention are not limited to the species of a Brevibacterium; any species of strain may be used, so long as it needs biotin and the like for its growth and can be used for L-glutamic acid production.

To cite some examples of strains of species other than Brevibacterium, there are *Bacillus subtilis*, *Escherichia coli*, *Aerobacter aerogenes* or *Cloacae Micrococcus glutamicus*, *Bacillus circulans*, *Bacillus megaterium*, *Bacillus cereus* intermediate, *Arthrobacter globiforme*, *Microbacterium sp.*, *Corynebacterium*, etc.

The optimal amount of alcohol addition depends on the kind of alcohol, the time of addition, the biotin content of the medium to which alcohols are added, whether or not saccharine material is fed, whether it is added only once or at several times, and the species or strain used. Too much addition will inhibit the growth of the organism and in consequence adversely affect the yield of glutamic acid.

In the case of fermentation with no feeding of saccharine material, the alcohol addition is sometimes made from the start, prior to the inoculation of the strain, in proportion to the biotin content, but it would be more appropriate to make an addition when the growth of organism has reached a proper phase, that is, usually at the initial stage of fermentation. The growth degree of the organism can be shown by periodic measurement of its optical density value (hereafter in abbreviated O.D.V.) at certain intervals. Experiment shows that the addition can most desirably be made when 30 times dilution of the culture broth manifests at a wave length of 610 m/v and O.D.V. of 0.08 to 0.70 by the Hitachi spectrophotometer. Depending on the kind of alcohol, it may evaporate and it should be replenished. Some portion may be added from the start and the rest may be reserved for subsequent addition in the course of fermentation. In such cases, it goes without saying that the addition of alcohol should be made with full consideration of the degree of organism growth. Addition at several times rather than once may occasionally bring better results and no conclusive statement can be made, but it is true that the most vital factor is the initial addition and its time.

In the case of the method including a feeding of saccharine material containing an excessive proportion of biotin in the course of cultivation, the time of saccharine material feeding, the addition of alcohol and its time of addition are the most important considerations.

The best time for saccharine material feeding is usually a little before the organism growth comes to the stationary phase, that is, when contributed the saccharine content of the medium which has helped initially the organism growth of is almost consumed. Addition of alcohol is ordinarily done after saccharine material feeding; in this case, too, the addition is done in several doses or occasionally a supplementary addition is made. Better results will be obtained when the amount of biotin in the culture medium a little before saccharine material feeding is larger than their optimal content when no saccharine material is fed. But if these contents are excessive, the yield of L-glutamic acid from the final fermented broth after saccharine material feeding will decrease.

In the case of the biotin content the culture medium of the organism used before saccharine material feeding is excessive, a small amount of alcohol should be added at an appropriate phase of organism growth, followed by cultivation and saccharine material feeding and again alcohol should be added, followed by cultivation. The sugar concentration of the feeding mash secured from a carbohydrate source must be initially so high that the subsequent sugar concentration of the culture medium may be equal to the desired value. On the other hand, the contents of biotin in the medium should be calculated.

The alcohols available for the present invention include not only normal alcohols like methyl, ethyl, butyl, propyl and amyl; common monohydric alcohols with side chains; but also higher monohydric alcohols like hexyl, heptyl, octyl, nonyl, decyl, undecyl, lauryl, tridecyl, stearyl; unsaturated alcohols; furfurylalcohols; their mixtures and substances containing them, which have also been proved to be suitable by tests and are covered by the claims of this invention.

In the following, experimental examples using different alcohols are given.

*Experiment 1*

Table 1 shows the relation between the biotin content of culture medium and the L-glutamic acid yield in the case of non-addition of alcohol.

TABLE 1

| Sugar concentration of molasses-fed medium, percent | Overall total sugar concentration, percent | Rate of [1] molasses added, percent | Biotin[2] amount of medium after molasses feed, γ/l. | O.D.V.[3] | Amount of glutamic acid, g./dl. | Glutamic acid vs. sugar |
|---|---|---|---|---|---|---|
| 0 | 4 | 0 | 0 | 0.360 | 1.84 | 46.0 |
| 0.3 | 4.06 | 1.48 | 1.2 | 0.368 | 1.89 | 46.5 |
| 1.0 | 4.2 | 4.76 | 4.0 | 0.372 | 1.86 | 44.4 |
| 1.5 | 4.3 | 6.98 | 6.0 | 0.576 | 1.56 | 36.2 |
| 3 | 4.6 | 13.0 | 12.0 | 0.675 | 1.58 | 34.3 |
| 5 | 5 | 20.0 | 20.0 | 0.786 | 1.32 | 26.3 |
| 15 | 7 | 42.9 | 60.0 | 0.820 | 1.63 | 23.3 |
| 30 | 10 | 60.0 | 120.0 | 0.910 | 1.65 | 16.5 |
| 43 | 12.6 | 68.2 | 172.0 | 0.920 | 1.88 | 15.0 |

[1] Rate of sugar addition in terms of molasses fed against total consumption of sugar.
[2] Reversely calculated from biotin in molasses fed (DAPA not counted).
[3] Expressed by optical density of the fluid after fermentation as measured in the manner described.

A. A culture medium was prepared with the composition; hydrolysate of starch (as glucose) 5%, urea 0.8%, $KH_2PO_4$ 0.1%, $MgSO_4 \cdot 7H_2O$ 0.04%, DAPA 20 γ/l., Mieki (soybean hydrolysate) 22 g. N per liter, 2 ml./dl., thiamine 200 HCl γ/l., $Mn^{++}$ 2 p.p.m., and $Fe^{++}$ 2 p.p.m. The said medium was poured into a 500 ml. capacity Sakaguchi type shaking flask in doses of 20 ml. each and sterilized. Then *Brevibacterium lactofermentum* No. 2256 A.T.C.C. 13869, which had preliminarily been cultivated for 24 hours at 30° C., was inoculated and then cultivated under shaking at 30° C., for 18 hours. It was then fed sterilely with a centrifuge-separated supernatant fluid of sterilized dilution of waste molasses as shown in Table 1 to make the total quantity of the broth equal to 25 ml. Thus the cultivation was continued. During the cultivation the pH of the medium was maintained between from 7.0 to 8.5 by adding of 50% sterile urea solution.

B. In the process A, the centrifuge-separated supernatant solution of diluted molasses fed in the course of fermentation was replaced with a centrifuge-separated supernatant solution of waste molasses with a sugar concentration of 30 g./dl., which was employed in the amounts as listed in Table 2 and the alcohols listed in the same table then added in the amounts specified for continuous cultivation. Fermentation was controlled in the same way as in A.

Table 2 shows that additions of these alcohols have improved the yield of L-glutamic acid as compared with that resulting when no such additions are made.

TABLE 2

| 30% molasses mash fed, ml. | Biotin amount in medium after feeding, γ/l. | Overall total sugar concentration, g./dl. | Alcohols added | Added amounts, percent | O.D.V. | L-Glutamic acid, g./dl. |
|---|---|---|---|---|---|---|
| 5 | 120.0 | 10 | | | 0.910 | 1.65 |
| 3 | 78.3 | 7.96 | Methanol | 1.5 | 0.61 | 3.20 |
| 5 | 120.0 | 10 | do | 2 | 0.720 | 4.37 |
| 5 | 120.0 | 10 | Ethanol | 2 | 0.735 | 4.20 |
| 5 | 120.0 | 10 | n-Propanol | 2 | 0.745 | 4.26 |
| 5 | 120.0 | 10 | i-Propanol | 2 | 0.730 | 4.32 |
| 5 | 120.0 | 10 | n-Butanol | 1 | 0.715 | 4.35 |
| 5 | 120.0 | 10 | i-Butanol | 1 | 0.720 | 4.48 |
| 5 | 120.0 | 10 | n-Amylate | 0.4 | 0.760 | 4.32 |
| 5 | 120.0 | 10 | i-Amylate | 0.4 | 0.755 | 4.44 |
| 5 | 120.0 | 10 | Sec-butanol | 1.0 | 0.765 | 4.53 |
| 5 | 120.0 | 10 | Tert-butanol | 1.0 | 0.820 | 4.21 |
| 5 | 120.0 | 10 | Diethyl carbinol (sec-amyl alcohol). | 0.4 | 0.850 | 4.37 |
| 5 | 120.0 | 10 | Tert-amyl alcohol | 0.5 | 0.840 | 4.16 |
| 5 | 120.0 | 10 | Fusel oil | 0.4 | 0.770 | 4.45 |
| 5 | 120.0 | 10 | n-Hexyl-alcohol | 0.2 | 0.840 | 3.96 |
| 5 | 120.0 | 10 | n-Heptyl alcohol | 0.1 | 0.860 | 3.54 |
| 5 | 120.0 | 10 | n-Octyl alcohol | 0.06 | 0.870 | 3.43 |
| 5 | 120.0 | 10 | 2-ethylhexyl alcohol | 0.06 | 0.830 | 3.55 |
| 5 | 120.0 | 10 | n-Nonyl alcohol | 0.03 | 0.780 | 3.93 |
| 5 | 120.0 | 10 | n-Decyl alcohol | 0.05 | 0.800 | 3.78 |
| 5 | 120.0 | 10 | n-Undecyl alcohol | 0.025 | 0.675 | 3.18 |
| 5 | 120.0 | 10 | n-Lauryl alcohol | 0.025 | 0.850 | 3.44 |
| 5 | 120.0 | 10 | n-Tridecy alcohol | 0.05 | 0.780 | 3.68 |
| 5 | 120.0 | 10 | n-Stearyl alcohol | 0.075 | 0.780 | 3.92 |

EXPERIMENT 2

Chain unsaturated alcohols, ring alcohols, furfuryl alcohols, etc. were experimentally proved to be as effective, which is shown by Table 3.

TABLE 3

| 30% molasses mash fed, ml. | Biotin amount in medium after feeding, γ/l. | Overall total sugar concentration, g./dl. | Alcohols added | Added amounts, percent | O.D.V. | L-Glutamic acid, g./dl. |
|---|---|---|---|---|---|---|
| 5 | 127.2 | 10 | α-Phenylethyl alcohol | 0.17 | 0.690 | 3.10 |
| 5 | 127.2 | 10 | β-Phenylethyl alcohol | 0.20 | 0.840 | 3.45 |
| 5 | 127.2 | 10 | Benzyl alcohol | 0.5 | 0.835 | 3.87 |
| 5 | 127.2 | 10 | Allyl alcohol | 0.01 | 0.845 | 3.56 |
| 5 | 127.2 | 10 | Diacetone alcohol | 1.0 | 0.720 | 4.43 |
| 5 | 127.2 | 10 | Furfuryl alcohol | 1.0 | 0.740 | 4.04 |
| 5 | 127.2 | 10 | Tetrahydroxy furfuryl alcohol | 1.0 | 0.765 | 4.23 |

These alcohols, when they were in an extremely small amount or in a solid form, were dissolved in ether and added in the specified amounts; addition of ether alone proved ineffective.

The other conditions can be the same as in the common L-glutamic acid production; namely, it would be desirable to maintain pH of the medium between from 7.0 to 8.5. For this purpose, urea or ammonia may, if necessary, be added during the process of fermentation. The fermenting temperature is normally held at around 30° C., but the optimum temperature should be chosen to suit the strain employed.

Fermentation is conducted under aerobic conditions, lasting 24 to 96 hours depending on the sugar content of medium, the fermenting conditions and the strain employed; usually it lasts 35 to 96 hours. The L-glutamic acid thus produced is recovered from the broth by the conventional process: The broth is heat-sterilized, cells are removed by the centrifuge and the resulting broth is treated by the conventional method to recover L-glutamic acid.

The following are examples of execution of this invention, which are given only for illustration and this invention should not be limited within the range of the examples.

*Example 1*

A. The filtrate of a hydrolysate obtained from ground power of corn grains was neutralized to pH 5.0 and was diluted to the concentration of 10% glucose. Based on this dilution, a cultural medium was prepared with the following composition: $KH_2PO_4$ 0.1%, $MgSO_4 \cdot 7H_2O$ 0.04%, $Mn^{++}$ 2 p.p.m. (as $MnSO_4 \cdot 7H_2O$) thiamine-HCl 100 γ/l. Mieki (Soybean hydrolysate) 0.2% and urea 0.8%. The said medium in doses of 20 ml. was poured into a 500 ml. Sakaguchi type shaking flask and sterilized at 120° C. for five minutes (with pH adjusted to 7.0). The biotin content of this medium was about 23 γ/l. To this medium was inoculated 0.5 ml. of a seed culture of *Brevibacterium sacharolyticum*, No. 7636 A.T.C.C. 14066, which had been separately cultivated under shaking; and further 0.8 ml. of sterile 50% urea solution was added thereto for continued cultivation at 30° C. under shaking. When the O.D.V. of the culture medium attained 0.2 (in the 4th to 10th hour), 0.12 ml. of iso-butanol was added and continued the fermentation. As a result, the content of L-glutamic acid in the culture medium amounted to 4.46 g./dl. in 72 hours of fermentation.

B. When no iso-butanol was added in the above-mentioned process, the content of L-glutamic acid amounted to mere 1.6 g./dl. in the same 72 hours.

In the above mentioned A and B procedures the contents of L-glutamic acid in the fermented broth and of biotin in the medium were measured by the bioassay using *Lactobacillus arabinosus*. And the seed culture medium used in the above-mentioned fermentation had been cultivated for 12 to 24 hours at 30° C. after inoculation and had the following composition:

Hydrolysate of starch (as glucose) 5.0%, $KH_2PO_4$ 0.1%, $MgSO_4 \cdot 7H_2O$ 0.04%, $Mn^{++}$ 2 p.p.m., $Fe^{++}$ 2 p.p.m., thiamine-HCl 200 γ/l., Mieki (soybean hydrolysate) 2.0%, [1] urea 0.8%, [2] DAPA 20 γ/l.

---

[1] Besides, 1.0% equivalent of urea plus 50% urea solution was separately sterilized and added before inoculation.
[2] A 50 γ/ml. solution of DAPA was separately sterilized and added before inoculation so as to give a specified amount.

Example 2

When in the process described under Example 1A, isobutanol was not added in the course of fermentation but from the start at the same time with the inoculation, 0.1 ml. of it was added with the result that the L-glutamic acid in the culture medium reached 4.32 g./dl. in 72 hours of cultivation.

Example 3

A culture medium was prepared by adding to an acid hydrolysate liquor (neutralized to pH 5.0) of dried sweet potato powder containing 13% sugar (as glucose) the following: $KH_2PO_4$ 0.1%, $MgSO_4 \cdot 7H_2O$ 0.04%, thiamine-HCl 200 $\gamma$/l., Mieki (soybean hydrolysate) 0.3%, $Mn^{++}$ 2 p.p.m., and urea 0.8%. Then 10 l. of this medium (biotin content 18.5 $\gamma$/l.) was poured into a 20 l. jar-fermenter, sterilized and adjusted to pH 7.5. Next, 500 ml. of the seed culture of *Brevibacterium lactofermentum*, No. 2256 A.T.C.C. 13869, which had been preliminarily cultivated under shaking for 14 hours was inoculated on the said medium and cultivated at 30° C. under aeration agitation.

In 4.5 hours of cultivation when the O.D.V. reached 0.18, 25 ml. of iso-amylalcohol was added and the cultivation was continued.

During the cultivation, the pH was adjusted to 7.8 by ammonia gas. In 46 hours of cultivation, the fermentation was finished, and the amount of L-glutamic acid in the broth fluid was equal to 5.28 g./dl.

After the broth was sterilized the cells were removed, concentrated, and then adjusted to a pH value equal to the isoelectric point of glutamic acid; thereafter it was left in cold air and as the result crude crystals were separated in the amount of 452 gr.

Example 4

A. A culture medium was prepared by adding of hydrolysate of corn containing 14.0% sugar (as glucose) the following: $KH_2PO_4$ 0.1%, $MgSO_4 \cdot 7H_2O$ 0.03%, thiamine-HCl 100 $\gamma$/l., $Mn^{++}$ 2 p.p.m., Mieki (soybean hydrolystate) 0.2%, and urea 0.8%. The obtained culture medium in the amount of 20 ml. was poured into a 500 ml. Sakaguchi type flask, and sterilized. 0.5 ml. and of the seed culture of *Brevibacterium flavum* No. 2247 A.T.C.C. 14067, which had preliminarily been cultivated for 18 hours, was inoculated in the medium and cultivated at 30° C. under shaking. When its O.D.V. reached 0.22 (in the 7th hour), 0.2 ml. of iso-butanol was added and the cultivation was continued. Further addition of 0.05 ml. of iso-butanol was made after 24 hours of cultivation. Thus, in 90 hours of cultivation the amount of L-glutamic acid in the broth attained 6.0 g./dl.

B. When in the above mentioned process A no iso-butanol was added the amount of L-glutamic acid in the broth was 1.76 g./dl.

C. When in the above-mentioned process A, iso-butanol was added only once, that is, 0.2 ml. of it was added at the moment when the O.D.V. reached 0.22, and no further addition was made, the amount of L-glutamic acid was 5.4 g./dl.

While the fermentation proceeded, urea was added little by little at appropriate times in order to maintain the pH at 7.0 to 8.5. The composition of the seed culture medium was the same as in Example 1 except that urea was added a little at a time.

Example 5

A culture medium was prepared by adding 0.2% $(NH_4)H_2PO_4$ and urea 1.6% to the supernatant solution, containing 10% total sugar (as glucose), of diluted and centrifuge-separated waste molasses. The said medium in the amount of 5 l., and a diluted hydrolysate containing sugar 10% (as glucose), of sweet potato starch in the amount of 5 l. were poured into a 20 l. par-fermenter (calculated biotin content more than 80 $\gamma$/l.), sterilized and adjusted to pH 7.0. Then, in the same way as in Example 4, the seed culture *Brevibacterium roseum*, No. 7 A.T.C.C. 13825, was inoculated and the cultivation was made under aeration-agitation; when the O.D.V. reached 0.71, a mixture of iso-butylalcohol 100 ml. and iso-amylalcohol 50 ml. was added and the cultivation was continued. The fermentation was finished in 46 hours. The pH value during the fermentation was controlled by feeding of ammonia gas, as was done in Example 4. The amount of L-glutamic acid was 3.26 g./dl.

Example 6

A culture medium was obtained by adding 0.1% $(NH_4)H_2PO_4$ 0.1% and urea 0.8% to the supernatant solution, containing 10% sugar 10% of diluted and centrifuge-separated waste molasses.

This medium in the amount of 20 ml. was poured into a 500 ml. Sakaguchi type flask, sterilized and then, as in Example 4, 1 ml. of the seed, preliminary, of *Brevibacterium lactofermentum*, No. 2256 A.T.C.C. 13869, was inoculated and cultivated at 30° C. under shaking. After 7 hours, alcohols and alcohol-containing substances as listed in Table 3 were added in the specified amounts and the cultivation was continued for 72 hours.

In the course of cultivation sterile urea solution was added as needed to maintain the pH in the range of 7.0 to 8.5. The yield of glutamic acid after fermentation was as indicated in Table 4.

TABLE 4

| Alcohols added | Added amounts, ml. | O.D.V. when alcohol added | Glutamic acid | Alcohols added | Added amounts, ml. | O.D.V. when alcohol added | Glutamic acid |
|---|---|---|---|---|---|---|---|
| Methanol | 1.2 | 0.720 | 1.84 | n-Amylalcohol | 0.2 | 0.720 | 3.48 |
| Ethanol | 1.2 | 0.760 | 2.23 | i-Amylalcohol | 0.2 | 0.770 | 4.13 |
| n-Propanol | 1.0 | 0.730 | 2.74 | Fusel oil | 0.26 | 0.760 | 3.98 |
| i-Propanol | 1.0 | 0.730 | 3.10 | | 0 | | |
| n-Butanol | 0.4 | 0.750 | 2.87 | No addition | 0 | | 0.30 |
| i-Butanol | 0.4 | 0.740 | 3.96 | | | | |

Example 7

A. A 13% sugar (as glucose) containing dilution of a hydrolysate of cassava meal was used to obtain a culture medium with $KH_2PO_4$ 0.1%, $MgSO_4 \cdot 7H_2O$ 0.04%, $Mn^{++}$ 2 p.p.m., thiamine-HCl 200 $\gamma$/l., Mieki (soybean hydrolysate) 0.2% and urea 0.8%, the biotin content of the said medium being 20 $\gamma$/l.

The said medium was cultivated in the same way as in Example 6; in the 8th hour of cultivation (when the O.D.V. was equal to 0.210), 0.25 ml. of iso-propanol was added and a cultivation was continued. As the result, in 72 hours of cultivation the amount of L-glutamic acid reached 5.6 g./dl.

B. In the case of cultivation with no addition of iso-propanol, the yield of L-glutamic acid was merely 1.4 g./dl.

Example 8

A culture medium was prepared with the following composition: Hydrolysate of starch containing 6% of sugar (as glucose), $KH_2PO_4$ 0.1%, $MgSO_4 \cdot 7H_2O$ 0.04%, DAPA 20 $\gamma$/l., Mieki (soybean hydrolysate) 2.0%, $Fe^{++}$ 2 p.p.m., $Mn^{++}$ 2 p.p.m., thiamine-HCl 200 $\gamma$/l. and urea 0.8%; 8 l. of this medium was poured into a 20 l. jar-fermenter, sterilized, adjusted to pH 7.0 and inoculated with 200 ml. of the seed culture of *Brevibacterium lactofermentum*, No. 2256 A.T.C.C. 13869, which had been cultivated for 15 hours.

Then the cultivation was made at 30° C. under aeration-agitation. In the 17th hour of cultivation, 2.3 l. of the supernatant solution obtained by centrifuge-separating at 3000 to 4000 r.p.m. a 43% sugar-containing waste molasses solution containing more than 50% (the supernatant solution containing about 420 γ/l. biotin) was sterilized and added sterilely; further with 50 ml. of fusel oil added, the cultivation was continued at the temperature raised to 37° C. During the fermentation ammonia gas was fed to the culture medium to maintain its pH at 7.8. In 30 hours after the feeding of saccharine solution, the fermentation concluded with 6.12 g./dl. of L-glutamic acid being yielded. By the conventional method crystal separation was made, yielding 400 gr. of crude crystals.

*Example 9*

$KH_2PO_4$ 8 gr., and $MgSO_4 \cdot 7H_2O$ 3.2 gr. were added to 8 l. of a dilution of beet sugar molasses with sugar concentration 5%. The entire amount of thus obtained culture medium was poured into a 20 l. jar-fermenter, sterilized, inoculated with 500 ml. of the previously prepared seed culture of preliminarily cultivated *Brevibacterium fravum*, 2247 A.T.C.C. No. 14067, and then cultivated under aeration-agitation. In the 4th hour of cultivation 30 ml. of i-butanol was added and in the 18th hour after that, 2 l. of a 42% sugar (as glucose) solution obtained by diluting waste molasses and subjecting it to hydrolysis with hydrochloric acid was sterilized and added sterilely, followed immediately by addition of 200 ml. of methanol. The cultivation was continued after the temperature was elevated to 37° C. The pH of the culture medium was adjusted to 7.8 by a feeding of ammonia gas. The fermentation came to an end in 26 hours after a feeding of molasses, with 4.86 g./dl. of L-glutamic acid being yielded.

What is claimed is:

1. The method of producing L-glutamic acid by cultivating glutamic acid producing bacteria which yield said acid in a culture medium containing biotin in an amount in excess of that sufficient for optimum growth of said bacteria, which method comprises the step of adding an alcohol to said culture medium, said alcohol being selected from at least one member of the group consisting of aliphatic monohydric alcohols, diacetone alcohol, furfuryl alcohol and tetrahydroxyfurfuryl alcohol, said alcohol being added in minor proportion sufficient to produce increased yield of L-glutamic acid.

2. The method of producing L-glutamic acid by cultivating glutamic acid-producing bacteria which yield said acid in a culture medium containing at least one substance having bacteria growth promoting properties substantially equal to that of biotin, said substance being present in an amount in excess of that sufficient to cause optimum growth of said bacteria, which method comprises the step of adding an alcohol to said culture medium, said alcohol being selected from at least one member of the group consisting of aliphatic monohydric alcohols, diacetone alcohol, furfuryl alcohol and tetrahydroxyfurfuryl alcohol, said alcohol being added in minor proportion sufficient to produce increased yield of L-glutamic acid.

3. The method claimed in claim 1 according to which said alcohol is added when the culture broth, thirty times diluted manifests at a wave length of 610 mu an O.D.V. of between .08 and .70, as measured by an Hitachi spectrophotometer.

4. The method of producing L-glutamic acid by cultivating glutamic acid-producing bacteria which yield said acid in a suitable culture medium which comprises the steps of adding to said medium a nutrient which contains a quantity of biotin in excess of that sufficient for optimum growth of said bacteria, and from .03% to 1.5% of an alcohol, said alcohol being selected from at least one member of the group consisting of aliphatic monohydric alcohols, diacetone alcohol, furfuryl alcohol and tetrahydroxyfurfuryl alcohol.

5. The method claimed in claim 4 in which said nutrient is added in at least two separate steps and said alcohol is likewise added in at least two separate steps.

6. The method claimed in claim 5 according to which nutrient is added for the second time when the growth of the bacteria in the medium comes to the stationary phase.

7. The method claimed in claim 2 in which said substance is selected from the group consisting of biotin derivatives, parent substances from which biotin may be derived, and 7,8-diaminopelargonic acid.

References Cited by the Examiner

UNITED STATES PATENTS

| | | | |
|---|---|---|---|
| 2,968,594 | 1/61 | Nubel | 195—47 |
| 3,066,078 | 11/62 | Miescher | 195—47 |
| 3,080,297 | 3/63 | Phillips et al. | 195—47 |

OTHER REFERENCES

Lamanna et al., Basic Bacteriology, pp. 600–603, 611–613, 617 and 625, pub. 1953 by The Williams & Wilkins Co., Baltimore.

A. LOUIS MONACELL, *Primary Examiner.*